United States Patent Office 3,062,854
Patented Nov. 6, 1962

3,062,854
PROCESS FOR PRODUCING 1,1'-BIS(TRIALKYL-SILYLCYCLOPENTADIENYL) IRONS
Charles R. Dickey and Everett A. Mailey, St. Albans, and Virgil E. Matthews, Charleston, W. Va., assignors to Union Carbide Corporation, a corporation of New York
No Drawing. Filed July 5, 1960, Ser. No. 40,527
6 Claims. (Cl. 260—439)

This invention relates to organometallic compounds. More particularly, the invention is directed to a process for the production of 1,1'-bis(trialkylsilylcyclopentadienyl)irons.

Prior to this invention, the known processes for preparing 1,1' - bis(trialkylsilylcyclopentadienyl)irons involved several steps which were relatively inefficient and resulted in relatively low yields of the desired product. For example, one process involved the reaction of bis-(cyclopentadienyl)iron with lithium and thereafter reacting the lithium derivative with a trialkylhalosilane. This process resulted in reduced yields because a mixture of mono-, di- and unsubstituted bis(cyclopentadienyl)irons was obtained. Further purification of this mixture was very difficult.

Another known process involved preparing trialkylsilylcyclopentadiene by the reaction of a cyclopentadienyl Grignard reagent with a trialkylchlorosilane. The trialkylsilylcyclopentadiene was then isolated, purified and reacted with lithium, and the lithium derivative thereafter reacted with iron chloride. The isolation of the intermediate compound was inefficient and seriously reduced the overall yield of the desired 1,1'-bis(trialkylsilylcyclopentadienyl)irons.

A further inefficient step in the prior processes was the recovery of the desired product by fractional distillation even under reduced pressure. Ordinary vacuum distillation is satisfactory where the trialkylsilyl groups contain a relatively small number of carbon atoms, for example, three carbon atoms in each alkyl group. With the longer chain alkyl groups ordinary fractional distillation resulted in poor separation and considerable loss of the 1,1'-bis-(trialkylsilylcyclopentadienyl)irons through thermal decomposition.

It is an object of the present invention to provide an efficient process for the production of 1,1'-bis(trialkylsilylcyclopentadienyl)irons.

A further object of the invention is to provide a process for producing 1,1'-bis(trialkylsilylcyclopentadienyl)irons which is not subject to the disadvantages of the processes heretofore known.

A further object of this invention is to provide a process for producing 1,1'-bis(trialkylsilylcyclopentadienyl)-irons which does not require isolation of the intermediate trialkylsilylcyclopentadiene.

A still further object of this invention is to provide a process for producing high purity 1,1'-bis(trialkylsilylcyclopentadienyl)irons in greater than 50 percent yields.

The process of this invention includes the three reactions represented by equations A, B and C below. The process also includes a method for purifying the trialkylcyclopentadiene product of equation A without isolating this intermediate product, and an efficient method for recovering the final product of equation C by film distillation.

(A) $R_3SiX + R'C_5H_4Na \rightarrow R'C_5H_4SiR_3 + NaX$ (B) $2R'C_5H_4SiR_3 + 2Na \rightarrow 2(R'C_5H_3SiR_3)Na + H_2$ (C) $2(R'C_5H_3SiR_3)Na + FeX_2 \rightarrow$
$(R'C_5H_3SiR_3)_2Fe + 2NaX$ In equations A, B and C, R represents an alkyl group, preferably containing from 8 to 20 carbon atoms, R' is hydrogen or an alkyl group, the alkyl group preferably containing from 1 to 6 carbon atoms and X represents a halogen, preferably chlorine or bromine. R, R', X have these same meanings throughout the description of the invention herein below.

For example, R may represent n-octyl, 2-ethylhexyl, n-decyl, isodecyl, dodecyl, pentadecyl, octadecyl, 10-n-pentylpentadecyl and the like and R' may represent methyl, ethyl, isopropyl, tertiary butyl, n-hexyl and the like.

The process of the present invention comprises the following five steps.

(1) A trialkylsilylcyclopentadiene, $R'C_5H_4SiR_3$, is prepared by the reaction of a trialkylsilicon halide, $R_3SiX$, and a cyclopentadienyl sodium, $R'C_5H_4Na$, in an ether solvent. For this step the reaction temperature is maintained between about −25° C. and about 35° C.

Suitable ether solvents are ethers containing only carbon, hydrogen, and oxygen, and having from two to about eight carbon atoms. Examples of suitable ether solvents are dimethyl ether, methyl ethyl ether, diethyl ether, methyl butyl ether, methyl hexyl ether, ethylene glycol dimethyl ether, ethylene glycol diethyl ether, ethylene glycol methyl butyl ether, diethylene glycol dimethyl ether, tetrahydrofuran, dioxane and the like.

The trialkylsilicon halide may be prepared by conventional procedures, for example, by the method described in J. Org. Chem. 24, 219 (1959). The cyclopentadienyl sodium may be also prepared by conventional procedures, for example, by the reaction in an ether solvent of a cyclopentadiene with a dispersion of sodium metal in xylene.

If desired a lithium or potassium derivative of the cyclopentadiene may be employed instead of the sodium derivative.

(2) The second step in the process of this invention is the purification of the trialkylsilylcyclopentadiene prepared in step (1). The purification step is efficient and can be carried out without requiring the isolation of the trialkylsilylcyclopentadiene. The final reaction mixture from step (1) is contacted with a water-immiscible ether solvent and an aqueous acid. The aqueous acid destroys any unreacted cyclopentadienyl sodium and also dissolves any sodium halide produced by the reaction of step (1). The removal of the unreacted cyclopentadienyl sodium is particularly important as a means for preventing the formation of unsubstituted or monosubstituted bis(cyclopentadienyl)irons in the subsequent steps of the process, thus greatly increasing the purity of the final product.

Suitable water-immiscible ether solvents are dialkyl ethers containing from two to about eight carbon atoms, such as methyl ethyl ether, diethyl ether, methyl butyl ether, ethyl ispropyl ether, ethyl butyl ether, methyl hexyl ether and the like.

The temperature for this portion of the purification step should be maintained between about −25° C. and 25° C., preferably between −5° C. and 0° C. At temperatures above about 10° C. some of the trialkylsilylcyclopentadiene may be decomposed. Any water-soluble acid may be employed in this step to form the aqeuous acid solution, for example, sulfuric acid, phosphoric acid, acetic acid and the like. Aqueous hydrochloric acid is preferred.

The water-immiscible ether solution containing the trialkylsilylcyclopentadiene is then separated from the aqueous portion of the mixture and dried by conventional procedures. The ether solution may then be used in step (3) without further purification. It is often desirable, however, to reduce the total volume of the ether solution by evaporating a portion of the solvent.

(3) The trialkylsilylcyclopentadiene from step (2) is then reacted with sodium metal to give a compound of the formula $(R'C_5H_3SiR_3)Na$. This reaction may be conveniently carried out by adding the ether solution of the trialkylsilylcyclopentadiene to a dispersion of sodium metal in an ether solvent. The temperature of this reaction should be maintained between about −25° C. and 35° C.

(4) The sodium derivative prepared in step (3) is then reacted with an iron halide, $FeX_2$, preferably ferrous chloride or ferrous bromide to give the 1,1'-bis(trialkylsilylcyclopentadienyl)iron, $(R'C_5H_3SiR_3)_2Fe$. In carrying out the reaction of step (4) it is convenient to add a dispersion of the iron halide in an ether solvent to the sodium derivative in ether solution prepared in step (3). Preferred ether solvents in this step are tetrahydrofuran and ethylene glycol dimethyl ether. The temperature of this reaction may be maintained in the range between about 0° C. and 100° C.

(5) The reaction mixture is then filtered and the filtrate containing the desired 1,1'-bis(trialkylsilylcyclopentadienyl)iron is then evaporated to remove the ether solvent. The residue from the evaporation of the solvent is then subjected to a film distillation to recover the 1,1'-bis(trialkylsilylcyclopentadienyl)iron. The term "film distillation" means a distillation in which a thin film of liquid is subjected to the temperature necessary for distillation for a short period of time. For film distillation any conventional molecular still, such as a Hickman falling-film still, may be used. The film distillation is particularly advantageous in recovering 1,1'-bis(trialkylsilylcyclopentadienyl)irons because the product is exposed to the distillation temperatures for only 2 to 5 seconds or less. Longer times at the distillation temperatures result in thermal decomposition of the product. This thermal decomposition is particularly serious in ordinary batch distillations where the product may be subjected to the distillation temperatures for 15 minutes or more.

The time employed in the reactions of steps (1), (3), and (4) is not critical and may vary depending upon the reaction temperature. Reaction times of 1 to 6 hours in step (1), 1 to 12 hours in step (3) and 2 to 20 hours in step (4) have been found to be suitable.

An inert atmosphere such as nitrogen, helium, argon, methane or other inert gas is preferably employed in steps (1), (3), and (4) to prevent contamination of the reaction mixture by oxygen and moisture. No particular advantage is gained by the use of an inert atmosphere in the other steps in the process of this invention.

The pressures employed in the process of this invention are not narrowly critical and atmospheric pressure is preferred in steps (1), (2), (3), and (4), no particular advantage being gained by elevated or reduced pressures. Reduced pressure is, of course, essential in the film distillation of step (5).

The mole ratios of reactants in steps (1), (3), and (4) is not narrowly critical. It is preferred, however, to employ a slight stoichiometric excess of the cyclopentadienyl sodium compound in step (1). This assures substantially complete reaction of the trialkylsilicon halide and any excess cyclopentadienyl sodium compound is destroyed by the purification procedures of step (2). Stoichiometric mole ratios of reactants are preferred in the reaction of step (4).

Examples of the process of this invention are (a) the reaction of methylcyclopentadienyl sodium with tri-2-ethylhexylsilylbromide in ethylene glycol dimethyl ether to give tri-2-ethylhexylsilylmethylcyclopentadiene, purification of this intermediate product by evaporation of the glycol ether, treatment with a mixture of diethyl ether and aqueous hydrochloric acid and separation of the purified ether solution of tri-2-ethylhexylsilylmethylcyclopentadiene, the reaction of this compound with sodium in mixed diethyl ether-ethylene glycol dimethyl ether solvent to give tri-2-ethylhexylsilylmethylcyclopentadienyl sodium, the reaction of this sodium derivative with ferrous bromide in diethyl ether-ethylene glycol dimethyl ether solvent to give the desired product 1,1'-bis(tri-2-ethylhexylsilylmethylcyclopentadienyl)iron, and the recovery of the desired product by evaporation of the solvent and film distillation of the residue; and (b) the reaction of cyclopentadienyl sodium with trioctadecylsilylchloride in tetrahydrofuran to give trioctadecylsilylcyclopentadiene, purification of this intermediate product by evaporation of the tetrahydrofuran, treatment with a mixture of diethyl ether and aqueous hydrochloric acid and separation of the ether solution of trioctadecylsilylcyclopentadiene, the reaction of this compound with sodium in mixed diethyl ether-tetrahydrofuran solvent to give trioctadecylsilylcyclopentadienyl sodium, the reaction of this sodium derivative with ferrous chloride in diethyl ether-tetrahydrofuran solvent to give the desired product 1,1' - bis(trioctadecylsilylcyclopentadienyl)iron, and recovery of the desired product by evaporation of the solvent and film distillation of the residue. In a similar manner, 1,1' - bis(tridecylsilylbutylcyclopentadienyl)iron is prepared using n-butylcyclopentadienyl sodium and tridecylsilylbromide as starting materials, dioxane as the ether solvent and dibutyl ether as the water-immiscible ether solvent.

A more detailed example of the process of the present invention is the following:

To a 12-liter flask, equipped with a stirrer, thermometer, addition funnel, and a nitrogen inlet and outlet, were added 2,853 grams (5.0 moles) of tri-n-dodecyl chlorosilane and 3400 ml. of anhydrous diethyl ether. The solution was maintained at 2° C. to 5° C. by means of an ice bath while 5.5 moles (10 percent excess) of cyclopentadienyl sodium in tetrahydrofuran was added over a period of three hours. [Cyclopentadienyl sodium was previously prepared by adding 330 grams (6.9 moles) of cyclopentadiene in an equal volume of tetrahydrofuran to 129 grams (5.5 moles) of sodium as a 30 percent dispersion and 3200 ml. of tetrahydrofuran which was distilled over sodium metal.] The resulting mixture was stirred an additional hour at 5° C., and then was stirred overnight at ambient temperatures. The mixture was distilled under reduced pressure to remove the tetrahydrofuran solvent to a kettle temperature not exceeding 20° C. Five liters of diethyl ether was added to the residue containing the tri-n-dodecylsilylcyclopentadiene, and the mixture was cooled to below 0° C. Aqueous hydrochloric acid (about 5 percent solution) was added slowly with vigorous stirring until the mixture was slightly acid as tested by litmus paper (approximately 100 ml. of the aqueous acid solution added). Distilled water (500 ml.) was added to solubilize the remaining solids, and then the resulting mixture was transferred immediately to a separatory funnel. The layers were separated and the organic layer, after washing once with 300 ml. of distilled water, was dried with anhydrous sodium sulfate. The ethereal solution of tri-n-dodecylsilylcyclopentadiene was decanted into a 12-liter flask for distillation of diethyl ether under reduced pressure to a kettle temperature not exceeding 20° C. This concentrated mixture was used in the next reaction without further treatment.

The above concentrated mixture was added over a five-hour period to a vigorously stirred dispersion of 119 grams (5.2 moles) of sodium in 5 liters of refined tetrahydrofuran. The temperature of the contents of the kettle was maintained with cooling at 0° C. to 5° C. during the addition and for one hour thereafter. The temperature of the mixture was then allowed to rise to ambient temperatures, and the mixture was stirred an additional seven hours. This mixture was used in the next reaction without further treatment.

To the above stirred mixture, previously cooled to 0° C. was added 2.5 moles (317 grams) of ferrous chloride in 2 liters of refined tetrahydrofuran in a nitrogen atmosphere. The temperature of the mixture rose to 18° C. after the addition of the ferrous chloride. After the mixture was stirred at ambient temperatures for one hour, it was heated to 55° C. and was maintained at that temperature for 12 hours. After the solvent was removed by distillation at reduced pressures, 5 liters of low boiling petroleum ether was added, and the mixture centrifuged through a nylon cloth. The filtrate was transferred to a 12-liter kettle for removal of the solvent under reduced pressure first at a kettle temperature not exceeding 25° C. and then at a kettle temperature not exceeding 100° C.

The residue after solvent removal was transferred to a molecular still and was subjected to a film distillation from which a substantially pure product was obtained. An overall yield of 54 percent of refined disubstituted product based on tri-n-dodecylchlorosilane was obtained. The product, 1,1′ - bis(tri - n - dodecylsilylcyclopentadienyl)iron, had the following analysis and physical properties:

| Elemental Analysis | Cal'cd. | Found |
|---|---|---|
| Carbon | 78.41 | 78.32 |
| Hydrogen | 12.66 | 12.73 |
| Silicon | 4.48 | 4.49 |
| Iron | 4.45 | 4.15 |

Color_____ Dark red.
Physical state_____ Slightly viscous liquid.
Odor_____ Slight oily smell.
Boiling point on film distillation_____ 290–295° C. at 3–5 microns Hg.
Refractive index ($n_D^{20}$)_____ 1.4922.

The compounds prepared by the process of the present invention possess exceptional thermal stability even at temperatures above 700° F. These compounds are, therefore, useful in lubricants in hydraulic fluid compositions where high-temperature operating conditions are involved.

What is claimed is:

1. A process for producing 1,1′-bis(trialkylsilylcyclopentadienyl)irons which comprises (1) reacting in an ether solvent at a temperature between −25° C. and 35° C. a trialkylsilicon halide represented by the formula $R_3SiX$, wherein R is an alkyl group containing from 8 to 20 carbon atoms and X is selected from the class consisting of chlorine and bromine, with a cyclopentadienyl sodium represented by the formula $R'C_5H_4Na$, wherein R' is selected from the class consisting of hydrogen and alkyl groups having from 1 to 6 carbon atoms, to give a trialkylsilylcyclopentadiene represented by the formula $R'C_5H_4SiR_3$, wherein R' and R have the meanings defined hereinabove, (2) purifying said trialkylsilylcyclopentadiene by contacting the final reaction mixture from step (1) at a temperature between −25° C. and 25° C. with a water-immiscible ether solvent and aqueous acid and thereafter separating a solution of substantially pure trialkylsilylcyclopentadiene in said water-immiscible ether solvent, (3) without isolating said trialkylsilylcyclopentadiene, reacting said trialkylsilylcyclopentadiene with sodium in an ether solvent at a temperature between about −25° C. and 35° C. to give a trialkysilylcyclopentadienyl sodium represented by the formula $(R'C_5H_3SiR_3)Na$, wherein R' and R have the meanings defined hereinabove, (4) reacting in an ether solvent at a temperature between 0° C. and 100° C. said trialkylsilylcyclopentadienyl sodium with an iron halide represented by the formula $FeX_2$, wherein X has the meaning defined hereinabove, to give a 1,1′-bis(trialkylsilylcyclopentadienyl)iron represented by the formula $(R'C_5H_3SiR_3)_2Fe$, wherein R' and R have the meanings defined hereinabove, and (5) recovering said 1,1′-bis(trialkylsilylcyclopentadienyl)iron by removing the solvent from the final reaction mixture from step (4) and subjecting the residue to a film distillation.

2. Process in accordance with claim 1 wherein R is 2-ethylhexyl and R' is methyl.

3. Process in accordance with claim 1 wherein R is dodecyl and R' is hydrogen.

4. Process in accordance with claim 1 wherein R is octadecyl and R' is hydrogen.

5. Process in accordance with claim 1 wherein said aqueous acid is aqueous hydrochloric acid.

6. A process for producing 1,1′-bis(tridodecylsilylcyclopentadienyl)iron which comprises (1) reacting in tetrahydrofuran at a temperature between −25° C. and 35° C. tridodecylchlorosilane and cyclopentadienyl sodium, to give tridodecylsilylcyclopentadiene, (2) purifying said tridodecylsilylcyclopentadiene by evaporating the tetrahydrofuran, contacting the residue with diethyl ether and aqueous hydrochloric acid at a temperature between −25° C. and 25° C. and separating the ether solution of tridodecylsilylcyclopentadiene, (3) without isolating said tridodecylsilylcyclopentadiene, reacting said tridodecylsilylcyclopentadiene, with sodium in mixed diethyl ether-tetrahydrofuran solvent at a temperature between −25° C. and 35° C. to give tridodecylsilylcyclopentadienyl sodium, (4) reacting in mixed diethyl ether-tetrahydrofuran solvent at a temperature between 0° C. and 100° C. said tridodecylsilylcyclopentadienyl sodium with ferrous chloride to give 1,1′-bis(tridodecylsilylcyclopentadienyl)iron, and (5) recovering said 1,1′-bis(tridodecylsilylcyclopentadienyl)-iron by removing the solvent from the final reaction mixture from step (4) and subjecting the residue to a film distillation.

References Cited in the file of this patent
UNITED STATES PATENTS
2,848,506    Breslow _____ Aug. 19, 1958

OTHER REFERENCES
Frisch, J.A.C.S., vol. 75, pp. 6050, 6051 (1953).